March 17, 1936.  J. B. DAVIS  2,034,229
AGRICULTURAL IMPLEMENT
Original Filed Sept. 22, 1931  4 Sheets-Sheet 1
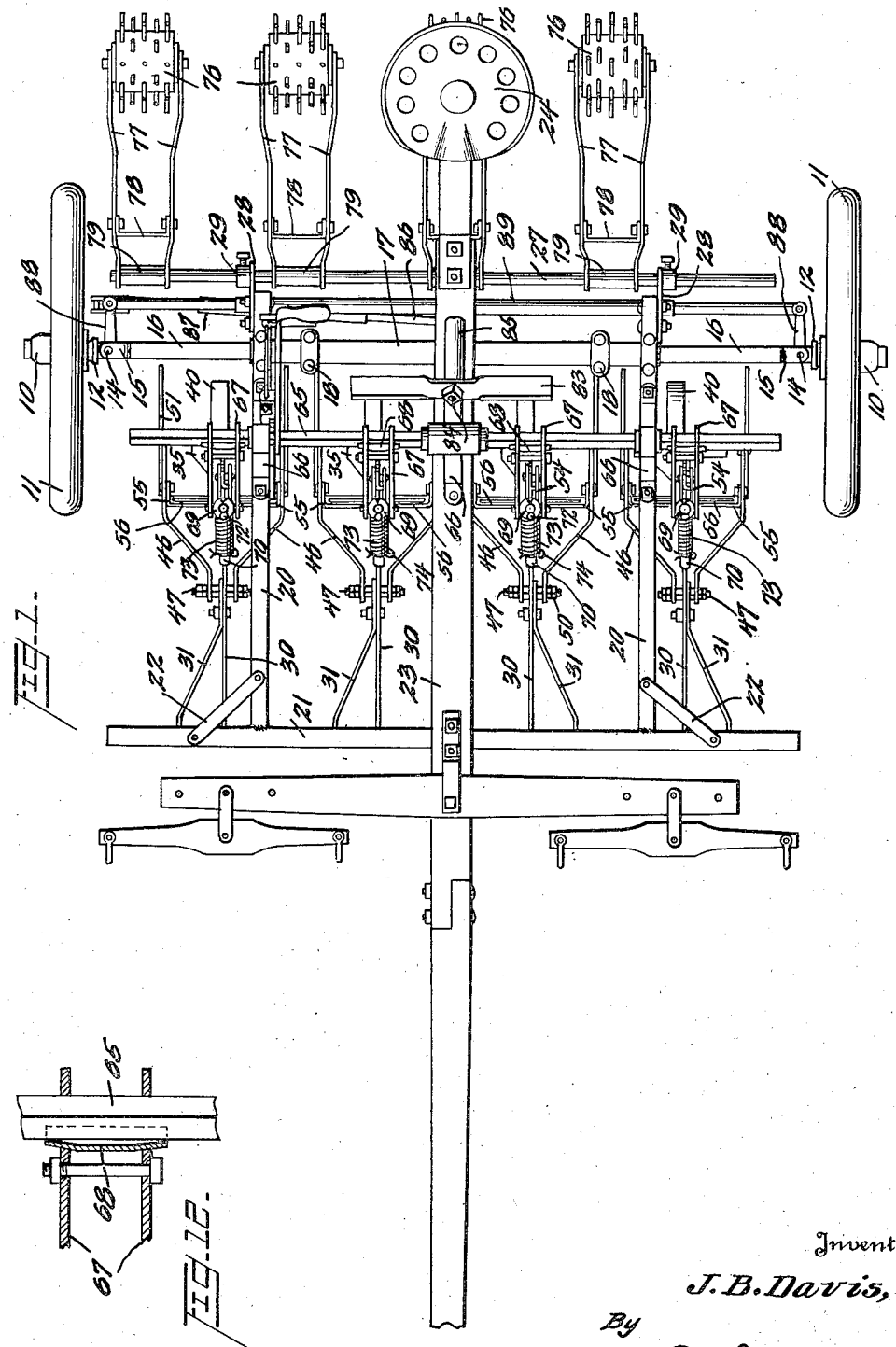
Inventor
J. B. Davis,
By
A. D. Adams
Attorney

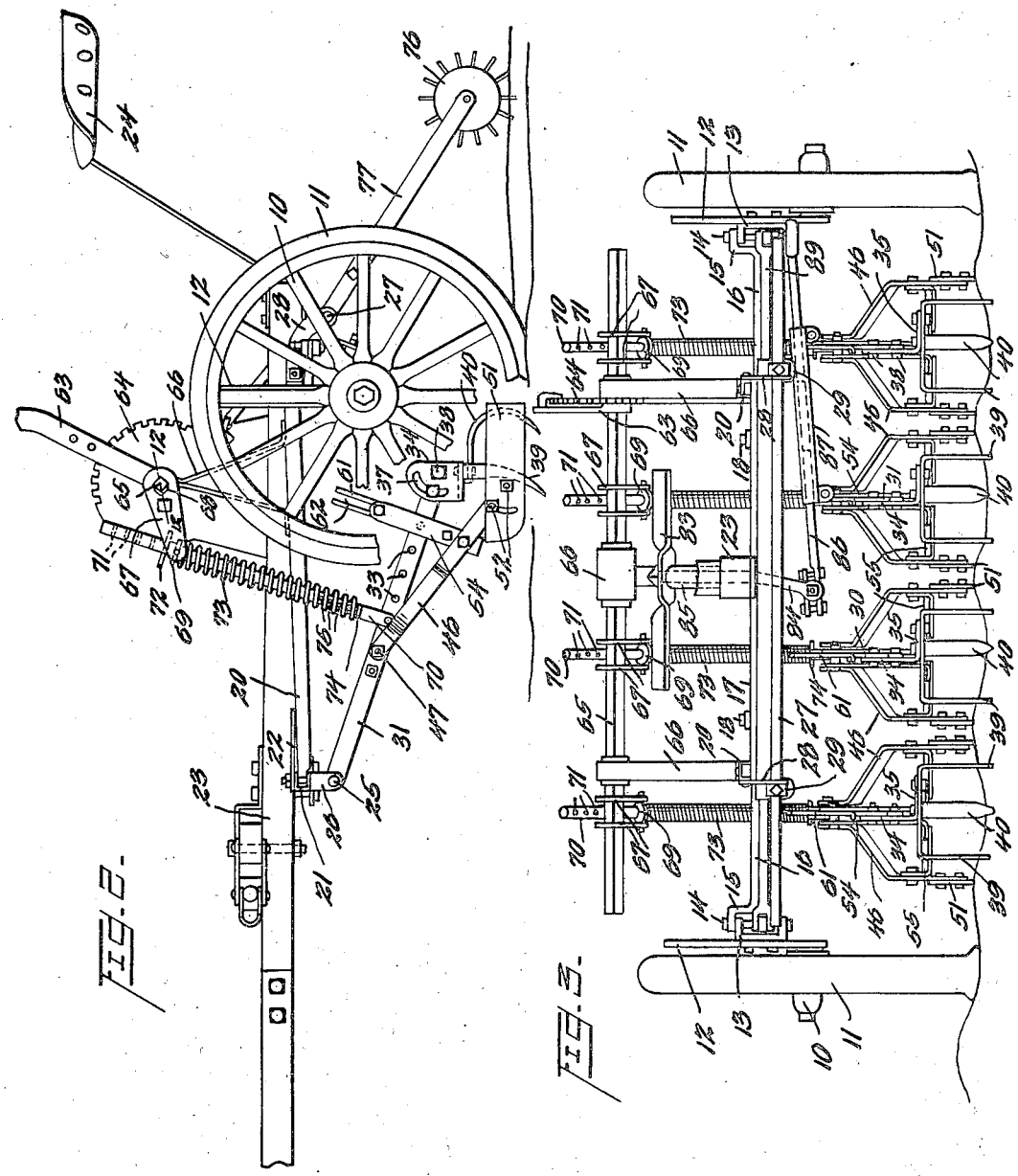

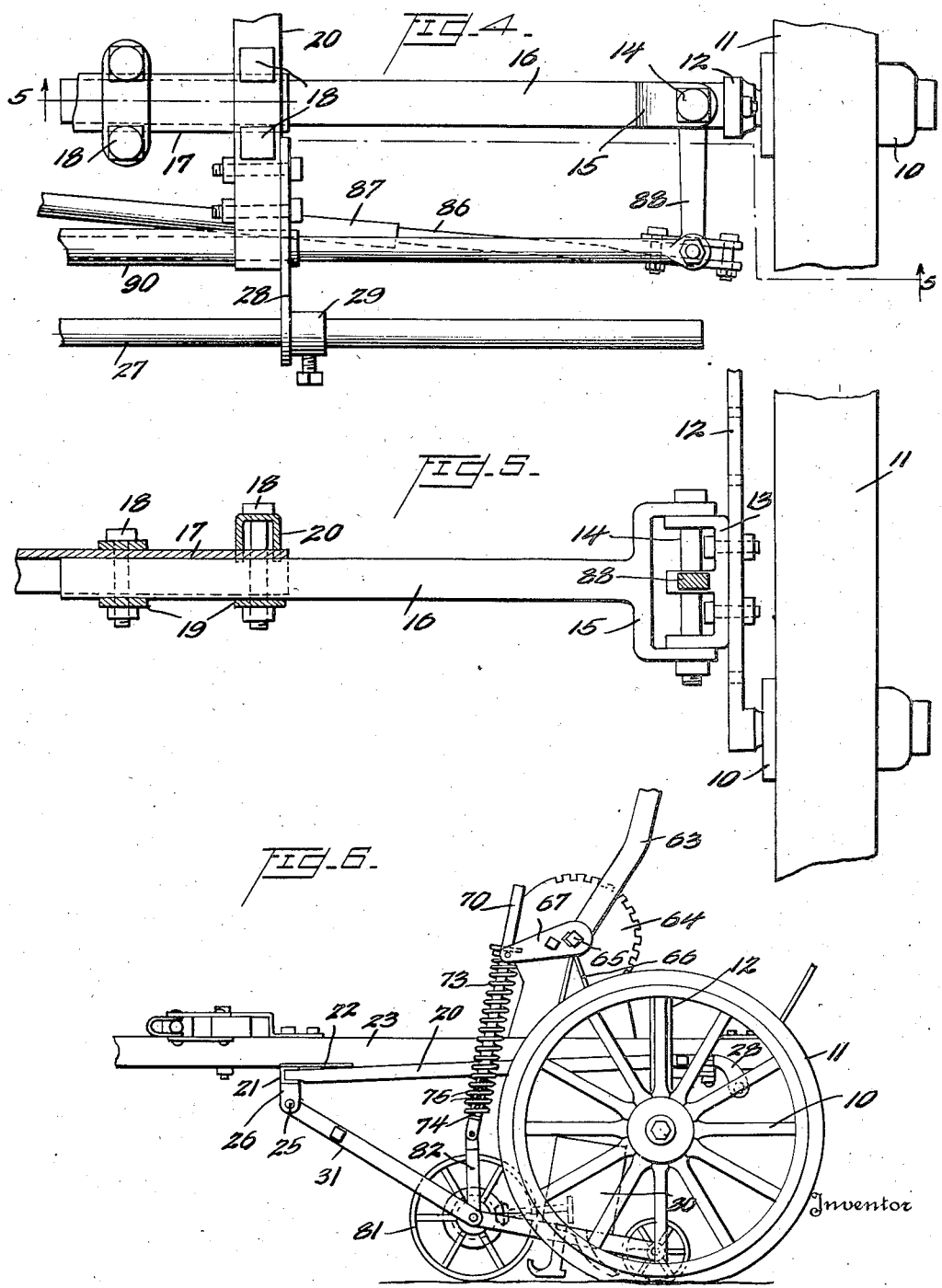

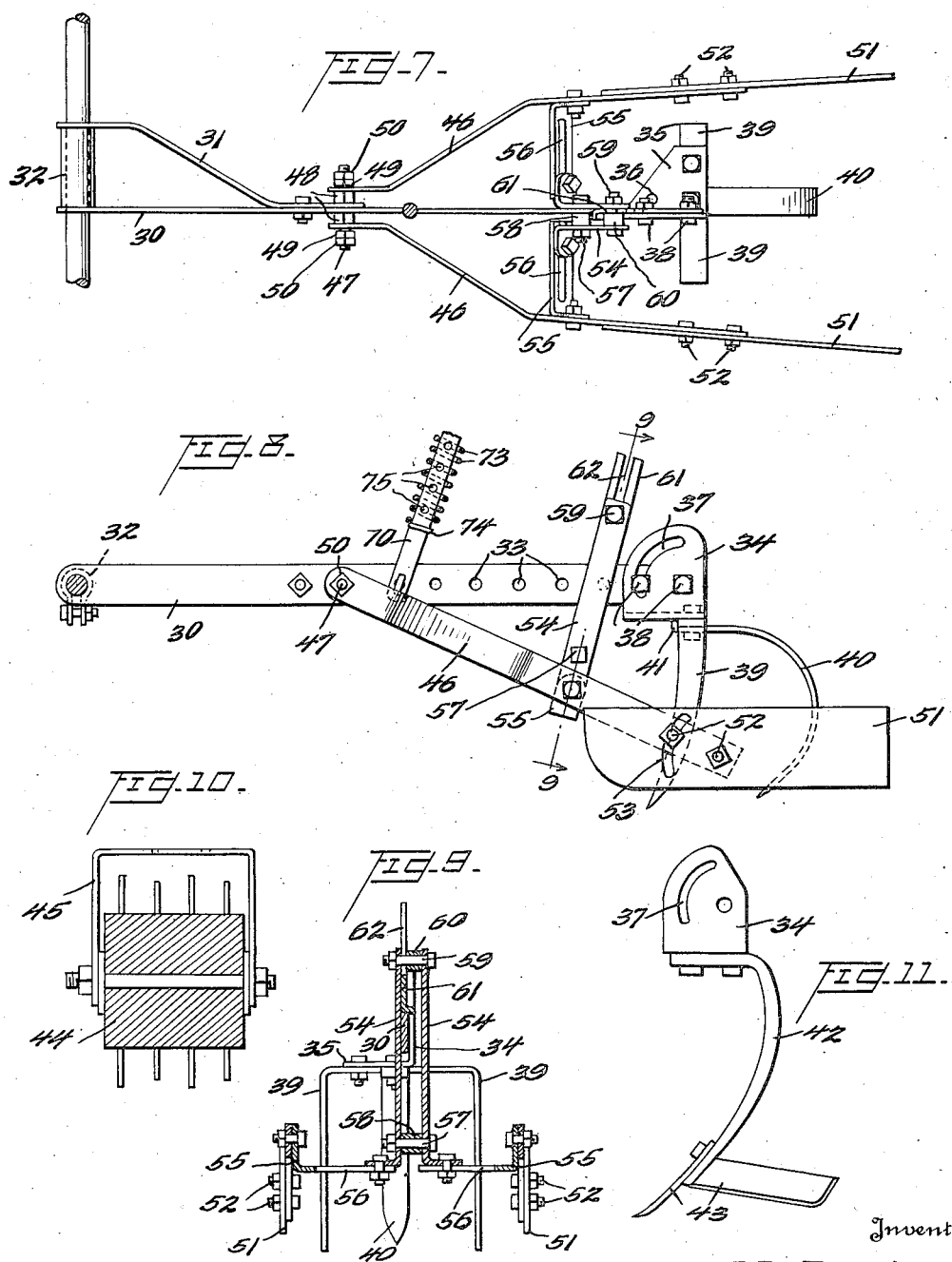

Patented Mar. 17, 1936

2,034,229

UNITED STATES PATENT OFFICE 2,034,229

AGRICULTURAL IMPLEMENT

John B. Davis, Tifton, Ga.

Application September 22, 1931, Serial No. 564,396
Renewed February 13, 1935

2 Claims. (Cl. 97—152)

This invention relates to agricultural implements and, among other objects, aims to provide an improved multiple-row cultivator having provision for carrying gangs of different types of farming tools. The main idea is to provide a single machine capable of being used to prepare land, put in fertilizer, sow the seed and cultivate the plants. Another important aim is to produce a machine of this character which has provision for a great variety of adjustments so as to enable it to be used on rows of any width, plants of different heights, ground of rugged contour, etc. The invention also contemplates the provision of a simple, relatively cheap, and strong machine which can be operated and adjusted by an ordinary farm laborer.

Other aims and advantages of the invention will appear in the description, when considered in connection with the accompanying drawings, wherein:—

Fig. 1 is a top plan view of the preferred machine showing different types of tools arranged in two gangs;

Fig. 2 is a side elevation of the machine shown in Fig. 1;

Fig. 3 is a rear elevation, the rear gang of tools being omitted;

Fig. 4 is a fragmentary plan view of the steering mechanism;

Fig. 5 is a sectional view taken on the line 5—5 of Fig. 4;

Fig. 6 is a fragmentary side elevation showing a planter or seeder hitched to the machine;

Fig. 7 is a top plan view of a beam carrying cultivating tools;

Fig. 8 is a side elevation of Fig. 7;

Fig. 9 is a sectional view taken on the line 9—9 of Fig. 8;

Fig. 10 is a vertical sectional view of a rotary hoe attachment for the cultivator beams;

Fig. 11 is a side elevation of a plow attachment; and

Fig. 12 is a fragmentary, sectional view taken on the line 12—12 of Fig. 2.

Referring particularly to the drawings, the improvements are shown as being embodied in a riding-type cultivator supported by a pair of steered wheels 10 preferably having deflated rubber tires 11 to prevent injury to growing plants and undue packing of the ground. Ordinary automobile wheels are well suited for the purpose. On the stub axle of each wheel is secured a vertical perforated arm 12 adjustably connected to a spindle arm or bracket 13 which is pivotally mounted on a king pin 14 in the forked end 15 of an axle section 16. The arrangement is such that the height of the machine may be adjusted. The two axle sections 16 are shown as being adjustably secured to a channel-shaped frame member 17 by means of spaced clamps in the form of pairs of bolts 18 and clamping plates 19 rigidly to support the axle sections. The sections are preferably square in cross section and fit snugly in the channel of the frame member 17 so that the flanges of the channel serve as braces to resist bending either forwardly or rearwardly. The construction is such as to permit the width of the machine or wheel tread to be varied according to the number and the width of the rows to be cultivated.

The channel beam 17 constitutes a part of the main frame of the machine, longitudinal channels 20 being secured to its opposite ends preferably by the axle clamping bolts 18 and a transverse beam 21 is welded or otherwise secured to the forward ends of the longitudinal beams, constituting the front frame member. This frame member extends laterally beyond the side frame members and its length determines the maximum width of the machine. Its outer ends may be braced by ordinary angle braces 22 (Fig. 1).

In this instance, a tongue 23 having provision for hitching two horses to the machine is bolted to the middle of the frame so as to support it substantially horizontally when a team is hitched to it. This tongue is shown as being made of jointed wood sections for convenience in shipping. However, it may be made of metal and suitable provision may be made to hitch it to a tractor. The tongue serves as a brace for the main frame and an ordinary driver's seat 24 is secured to its rear end.

A front transverse bar 25 is slidably mounted in depending brackets 26 secured to the bottom of front frame member 21 (Fig. 2) and is adapted to be held against endwise movement by set-collars or set-screws (not shown). This front bar provides a hitch member for the front gang of implements, later to be described. A similar transverse bar 27 is also shown as being slidably secured in rearwardly extending brackets 28 which are bolted or otherwise secured to the rear ends of the frame members 20. This bar is held against endwise movement by a pair of set-collars 29 abutting the brackets (Fig. 1) and the front bar is preferably secured in the same manner. The rear bar provides a hitch member for the beams of a rear gang of implements. Both bars can easily be released and slid endwise in their brackets to permit quick attachment and removal of the implement beams about to be described.

Referring to Figs. 1 and 2, a plurality of spaced, strap metal beams 30 are shown as being pivotally mounted at their forward ends on the front hitch bar 25. Each of the beams is shown as having a bent arm 31 secured to it to provide a forked end engaging the bar at spaced points to prevent lateral movement. The forked ends are slid on and adjustably secured to the front bar preferably by means of split, clamping collars 32 between the forks. This arrangement enables the beams to be quickly applied and adjusted to suit the width of the rows to be cultivated or planted. The rear ends of the beams are shown as having a series of spaced holes 33 in selected pairs of which the vertical wings or flanges 34 of the tool-carrying brackets are secured. Each of the brackets is preferably made of bent sheet metal and has a horizontal flange 35 presenting a series of bolt openings 36 to provide means for securing special tools, hereinafter described. The vertical wings are mounted for pivotal adjustment on the beams by means of arcuate slots 37 engaging front clamping bolts 38 which pass through the beams. Thus, the depth of penetration may be adjusted.

In Figs. 1, 2, 3, 7, 8, and 9, special cultivating tools are shown as being bolted to the brackets 35, a pair of front teeth 39 being formed of a single piece of steel bent U-shaped and secured by two bolts to each bracket and a single bent tooth 40 having an upwardly bent forward end or shoulder 41 is secured midway between the teeth by one of the bolts with its end engaging the front edge of the connecting or bolted portion of the front teeth to prevent pivotal movement about the bolt (Fig. 8). The separate middle teeth are desirable because they can be removed and the front teeth used to straddle rows of plants after they are a few inches high.

The distance between the front pairs of teeth may be such as to cultivate the middles of rows of ordinary width. In many instances, the special cultivators will be used on rows about sixteen inches apart. However, sets of teeth of different widths may be supplied for rows of other widths. Moreover, a variety of other special tools may be secured to the brackets. For example, a plow foot 42 carrying ordinary tilling tools 43 (Fig. 11) may be secured to each bracket by a pair of bolts. Also, a rotary hoe 44 may be connected to the brackets by means of special supporting members or bails 45 pivotally mounted on their shafts (Fig. 10).

Special adjustable fenders are provided for attachment to each beam to protect small plants. In this example, the strap metal arms 46 are pivotally secured at their front ends to screw-threaded pins 47 between arm clamping nuts 48 and spaced nuts 49 which are held adjusted by lock nuts 50 so as to permit the fender arms to swing. Sheet metal fender blades 51 are shown as being adjustably secured to the rear ends of the arms by means of spaced bolts 52 and an arcuate slot 53 in each blade permits it to be adjusted angularly so that the lower edge will lie parallel with the surface of the ground when the beam is lowered for the tools to penetrate to the desired depth.

The fenders are guided vertically and braced laterally by a pair of spaced flat bars 54 which straddle each beam 30 and angle brackets 55 are bolted to the lower bent ends of the bars and to the fender arms. The inner ends of the angle brackets have longitudinal slots 56 to permit lateral adjustment of the fenders. The lower ends of each pair of bars 54 are secured to each other by a bolt 57 and a spacing washer 58 which provides a stop to strike the beam. The upper ends of the bars are secured together by a bolt 59 and also a spacing washer 60. An L-shaped supporting member 61, having a slot 62, is adjustably clamped between the washer 60 and the inner face of one of the bars. The lower end of the stop member is adapted to rest on the beam 30 and support each pair of fenders at the desired height with reference to the cultivator tools. By releasing the clamping pressure on the slotted end of the supporting member, it may be adjusted to raise or lower the fenders. Lateral adjustments of the fenders may be made by releasing the clamping pressure on slotted arms 56 and sliding them inwardly or outwardly. When the fenders are not needed, they may be removed. Further, the fenders are individually removable so that either one may be used.

All of the beams 30 are adapted to be raised and lowered by means of a single hand lever 63 cooperating with a notched segment 64 and mounted on a square rock-shaft 65 which is journalled on the frame in upstanding brackets 66 conveniently made of strap metal and secured to the side frame members. Pairs of spaced rocker arms 67 are shown as being adjustably secured to the rock-shaft by means of V-shaped metal wedges fitting against the front edge of the rock-shaft, each pair of arms having a transverse bolt extending through them in front of the wedges 68 (Fig. 12) to exert clamping pressure on the tapered ends of the wedges. The forward ends of the arms carry trunnion washers 69 between them to provide pivotal guides and stops for beam-lifting and pressure bars 70 which are pivotally secured to the beams 30 intermediate their ends, so that a relatively small movement of the hand lever is required to manipulate the tools. The upper ends of the bars have a series of spaced perforations 71 to receive cotter pins 72 above the trunnioned, guide washers, the arrangement being such that the effective lengths of the bars may be adjusted.

Ordinary compression springs 73 are mounted on the bars between the washers and cotter pins 74 inserted in one of a series of spaced holes 75 in the lower portions of the bars. The spaced holes provide means for regulating the pressure of the springs on the respective beams. Furthermore, when the upper cotter pins 72 are inserted in the upper holes 71, the springs may be adjusted accordingly to insure adequate working pressure on the beams. The adjustments of the effective lengths of the bars permit them to be used when the machine frame is raised or when the tools have to work in deep furrows or middles. Moreover, the cotter pins may be inserted nearer their upper ends when the cultivator is used on more or less hilly or irregular ground to permit the beams to swing downwardly relative to each other. That is to say, when the tools on one or more beams strike low places, the pressure springs are free to push the bars downwardly and keep all of the tools in the ground, the movement being limited only by the cotter pins 72 striking the trunnioned, guide washers. Likewise, such adjustments enable the push bars or rods to keep all of the tools in the ground at a substantially uniform depth even when a wheel runs over an obstruction and raises one side of the machine. These features are very important because they make the machine useful on practically all kinds of cultivatable ground.

The arrangement of the hand lever 63 is such that an operator on the seat has to pull it rearwardly to raise the beams 30 and the tools. Very little effort is required to do this because of the lever connections. However, the hand lever is purposely arranged to be swung forwardly to force the tools in the ground so as to enable the operator to apply more force by bracing himself against the seat and straightening his arm which grasps the lever. Furthermore, it will be noted that the length of the beams 30 are such that all of the tools on them are slightly in advance of the axle where the operator can observe them without turning his head or looking backwardly. This is especially important when the operator has to drive a team. Further, by this arrangement the tools follow curved rows without dragging sidewise across them when the machine turns a curve.

In Figs. 1 and 2, a plurality of rotary hoes 76 are shown by way of example as being connected to the rear cross bar or hitch rod 27. In this example, the rotary hoes have bent, strap metal beams 77 on each side, connected to ends of the axle bolts of the hoes and having U-shaped, cross braces 78 near their hitching ends. Their forward ends are preferably spaced apart the same distance as the hitching ends of the beams 30 so that they are interchangeable with the front beams. These beams are adjustably secured to the bar 28 by clamping collars 79 between the arms. It will be understood that this type of beam may be used on ordinary single-row planters, fertilizer distributors, etc. In the illustrative example, the rotary hoes are adapted to run over the rows cultivated by the front tools. In some cases, however, the rear gang of tools will be adjusted to run directly behind the front tools, as, for example, planters behind distributors.

In Fig. 6, there is shown a planter 80 of a well known type connected to the front hitch bar 25 by beams 77 like the beams just described. In this case, the hand lever is utilized to lift the drive wheel 81 of the planter by connecting the bars 70 to pivoted forked links or arms 82 mounted on the wheel axle, the arrangement being such that the pressure springs do not function. By lifting the ground wheels all of the planters will be disabled or stop discharging seeds. This feature is very desirable when the machine is being turned around at the ends of rows and expensive seeds are being used.

As has been intimated, the machine is designed to be steered independently of the draft animals, the purpose being to enable the operator to turn curves properly without cutting across plants and to turn around on short head lands. In this example, the steering mechanism is foot-operated by means of a treadle bar 83 mounted on a steering rod 84 which extends through a tubular column 85 running through a hole in the rear end portion of the beam. The rear end of the rod 84 is connected to a steering bar or rod 86 (Figs. 1 and 6) which has a tubular telescopic section 87 to permit it to be adjusted to suit the width of the machine. The other end of the steering bar is connected to one of the spindle brackets 13 and the two brackets have steering arms 88 connected by a telescopically adjustable reach rod or bar 89 which also has a tubular section 90. It will thus be seen that the operator can easily guide the machine by foot power.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In a cultivator of the class described having a pair of wheels connected by an adjustable axle, a pair of longitudinal side frame members secured to the axle; a transverse structural frame member rigidly secured to the forward ends of the side frame members; depending angle brackets on the transverse structural frame member; a bar slidably mounted in said depending brackets; a series of beams pivotally and adjustably mounted at their forward ends on said bar and each having an angle brace to prevent lateral swinging movement; upstanding brackets secured to said longitudinal side frame members; a square rock-shaft journaled in said upstanding brackets; a hand lever mounted directly on said rock-shaft; a series of rocker arms adjustably mounted on said rock-shaft; sheet metal guide members each having trunnions pivotally mounted in said rocker arms; push bars pivotally secured to said beams and projecting through said guide members; compression springs mounted on said push bars to exert spring pressure on the respective beams, each of said beams having a series of spaced holes whereby to adjust the connection of the push bars; and flanged tool-carrying brackets adjustably secured to said beams.

2. In a cultivator of the class described having a pair of wheels, an extensible axle having means to be secured at different heights with respect to the wheels; a pair of longitudinal side frame members secured to the axle; a transverse structural frame member rigidly secured to the forward ends of the side frame members; a tongue connected to said transverse frame member and to the axle; depending brackets on the transverse structural frame member; a bar slidably and removably mounted in said depending brackets; a series of beams pivotally and adjustably mounted at their forward ends on said bar and each having an angle brace to prevent lateral swinging movement; upstanding brackets secured to said longitudinal side frame members; a rock-shaft journaled in said upstanding brackets; a hand lever mounted directly on said rock-shaft having means to lock it in adjusted positions; a series of rocker arms adjustably mounted on said rock-shaft; guide members each having trunnions pivotally mounted in said rocker arms; push bars pivotally secured to said beams and projecting through said guide members; compression springs mounted on said push bars to exert spring pressure on the respective beams; and flanged tool-carrying brackets pivotally and adjustably mounted on said beams.

JOHN B. DAVIS.